(No Model.)
W. C. KELLY.
NUT LOCK.
No. 256,574. Patented Apr. 18, 1882.
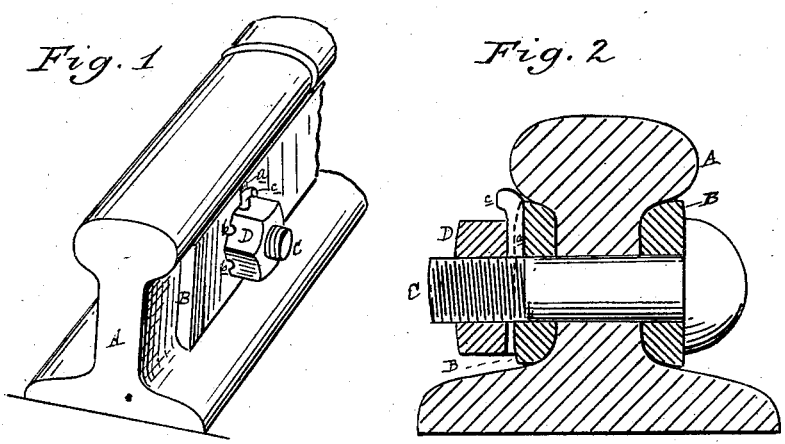
Attest:
A. Barthel
E. Scully
Inventor:
Wallace C. Kelly
per Thos. S. Sprague
Att'y

UNITED STATES PATENT OFFICE.

WALLACE C. KELLY, OF HASTINGS, MICHIGAN.

NUT-LOCK.

SPECIFICATION forming part of Letters Patent No. 256,574, dated April 18, 1882.

Application filed February 16, 1882. (No model.)

*To all whom it may concern:*

Be it known that I, WALLACE C. KELLY, of Hastings, in the county of Barry and State of Michigan, have invented new and useful Improvements in Means for Locking the Nuts of Railway-Joints; and I do hereby declare that the following is a full, clear, and exact description thereof, reference being had to the accompanying drawings, which form a part of this specification.

The nature of this invention relates to certain new and useful improvements in means for securing nuts in place against accidental displacement on bolts where from vibrations or other causes the nuts gradually work loose; and the improvement is especially adapted to securely hold the nuts upon bolts employed in the construction of railway-joints.

The invention consists in the peculiar construction of the parts and their combination, as more fully hereinafter described.

Figure 1 is a perspective section of a railway-joint, showing my improvement. Fig. 2 is a vertical cross-section of the same through the axis of the bolt.

In the accompanying drawings, A represents the rail, and B B the fish-plates, one on each side of the rail, and the parts secured together by the bolt C and nut D, all the parts being in the usual arrangement and construction in railway-joints, except as hereinafter described.

A groove, *a*, is made by a punch or otherwise in the outer face of the fish-plate, extending vertically over the axis of the bolt-hole therein and from the periphery of said hole to the top edge of the fish-plate. One or more similar grooves, *b*, are provided on the inner face of the nut, extending from the central hole therein to the outer edge of the nut. In operating this device the nut is turned up on the bolt against the fish-plate until one of the grooves in the nut is coincident with the vertical groove in the fish-plate, when a key or piece of iron corresponding in size and shape with that of the space or opening at that point between the nut and fish-plate is easily inserted. Then the nut is turned backward a little until it pinches the key *c*. To release the parts the nut is started forward a trifle until the key is loose, when it may be removed and the nut run off.

The means described, while peculiarly applicable to the construction of railway-joints, will be found valuable to secure the nut in place and prevent the bolt from turning when the nut is screwed against a fixed surface.

The shape or size of the grooves is immaterial; but it is essential that the key be of similar shape and size.

I am aware that it is not new with me to provide plates with grooves to correspond with grooved nuts and a locking-key, such construction being shown in the patent of W. P. Porter, dated June 1, 1869, No. 90,685; and I do not claim the construction covered by the said patent. My invention relies for its importance upon the perforated fish-plate having a vertical groove above each bolt-hole, adapted to serve with a nut having radial grooves and a key which will lock the nut to the fish-plate, being held in place by its own gravity without the necessity of driving or wedging the key, the consequent trouble in removal, or the liability to jar out of place.

What I claim is—

A fish-plate having bolt-holes and a vertical groove above each bolt-hole, a nut having radial grooves, and a key for locking the nut and fish-plate together, the whole combined and operating to lock the parts by the gravity of the key, as set forth.

WALLACE C. KELLY.

Witnesses:
JOHN BESSMER,
WM. H. HOLBROOK.